United States Patent [19]
Davis et al.

[11] Patent Number: 5,807,490
[45] Date of Patent: Sep. 15, 1998

[54] METHOD OF SEPARATING POLYMERS FROM MIXTURES THEREOF

[75] Inventors: Michael A. Davis; Jeffrey S. Dugan, both of Asheville; Matthew B. Hoyt, Arden; Charles F. Helms, Jr., Asheville, all of N.C.

[73] Assignee: BASF Corporation, Mt. Olive, N.J.

[21] Appl. No.: 621,637

[22] Filed: Mar. 26, 1996

Related U.S. Application Data

[63] Continuation-in-part of Ser. No. 337,208, Nov. 8, 1994, abandoned.

[51] Int. Cl.[6] .............................. B01D 57/00; B29C 47/06
[52] U.S. Cl. ........................ 210/739; 210/773; 210/806; 210/808; 210/322; 264/172.15
[58] Field of Search ..................................... 210/773, 806, 210/808, 322, 739; 264/172.15

[56] References Cited

U.S. PATENT DOCUMENTS

| | | | |
|---|---|---|---|
| 3,726,955 | 4/1973 | Hughes et al. ........................... | 264/171 |
| 5,126,201 | 6/1992 | Shiba et al. .............................. | 428/329 |
| 5,162,074 | 11/1992 | Hills ........................................ | 156/644 |
| 5,241,066 | 8/1993 | Davis et al. ............................. | 540/540 |
| 5,264,536 | 11/1993 | Radosz .................................... | 528/483 |
| 5,587,118 | 12/1996 | Mallonee .................................. | 264/78 |

OTHER PUBLICATIONS

Han "A Study of Bicomponent Coextrusion of Molten Polymers" J. Appl. Polym. Sci. 17, 1289, 1973.

Kidd et al., "Incineration: Can It Save Overused Landfills?", A New System for Thermoplastic Recycling and A Report on a New XNY Fiber and a Recycling Breakthrough, *Thermoplastic Waste Reclamation Workshop Agenda*, Office of Professional Development, Clemson University, Feb. 9–10, 1993.

W. Kaminsky, "Recycling of Polymeric Materials by Pyrolysis", *Makromol. Chem., Makromol. Symp.* 48/49, 381–391 (1991).

"Honing Technology to Improve Economics", *Chemicalweek*, Dec. 18/25, 1991, pp. 37–38.

White et al., "Theory of Interface Distortion in Stratified Two–Phase Flow", *Transactions of the Society of Rheology*, 19:3, 457–479 (1975).

*Primary Examiner*—Jeffrey Mullis

[57] ABSTRACT

A method of separating two immiscible, melt-viscosity-differing thermoplastic polymer components from a mixed liquid stream thereof forms two discrete and continuous phases having a sheath/core configuration, wherein the sheath substantially contains the polymer component with the higher melt viscosity and the core substantially contains the polymer component with the lower melt viscosity. The mixed liquid stream contains a predominant amount (i.e., greater than 50% by volume) of the higher viscosity polymer component and a minority amount (i.e., less than 50% by volume) of the lower viscosity polymer component. The method involves directing the stream through a shear zone at a shear temperature and a shear rate sufficient to form the two discrete and continuous phases, the first of which substantially contains the lower viscosity polymer component and the second of which substantially contains the higher viscosity polymer component.

35 Claims, 5 Drawing Sheets

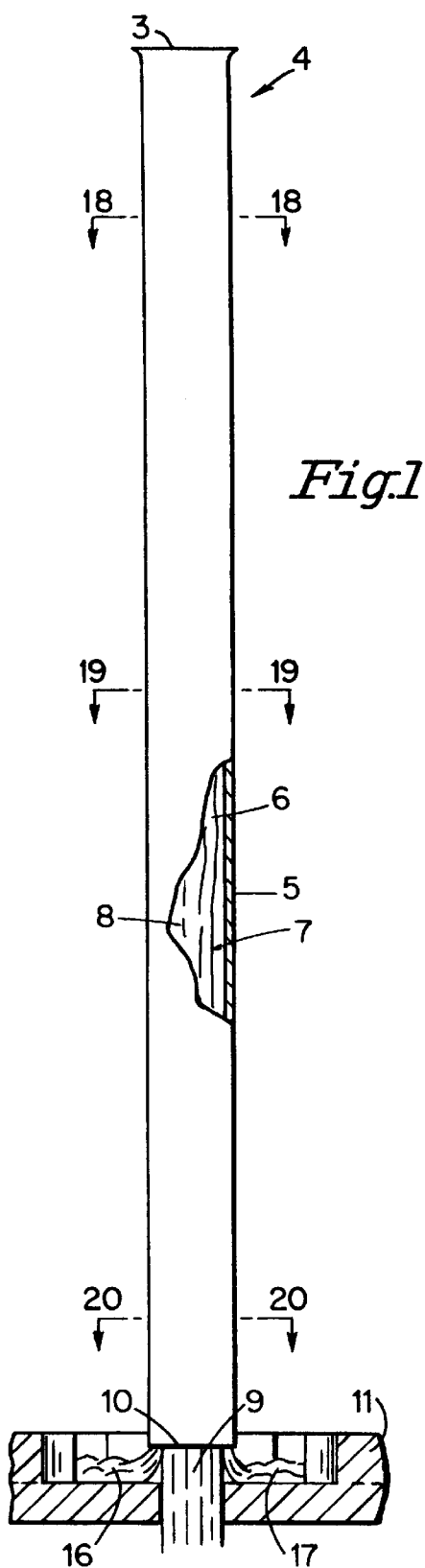
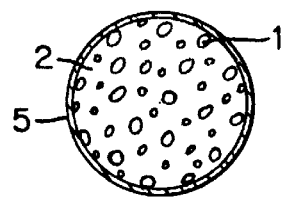
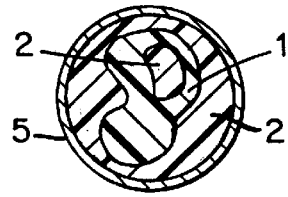
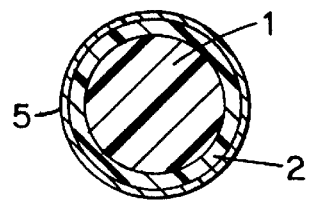
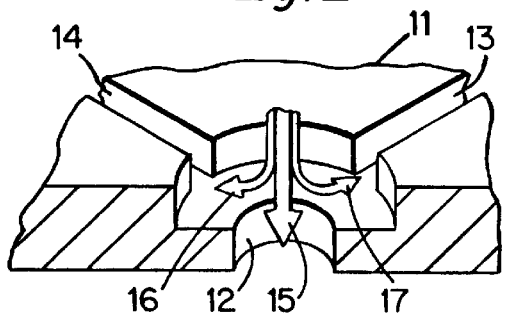

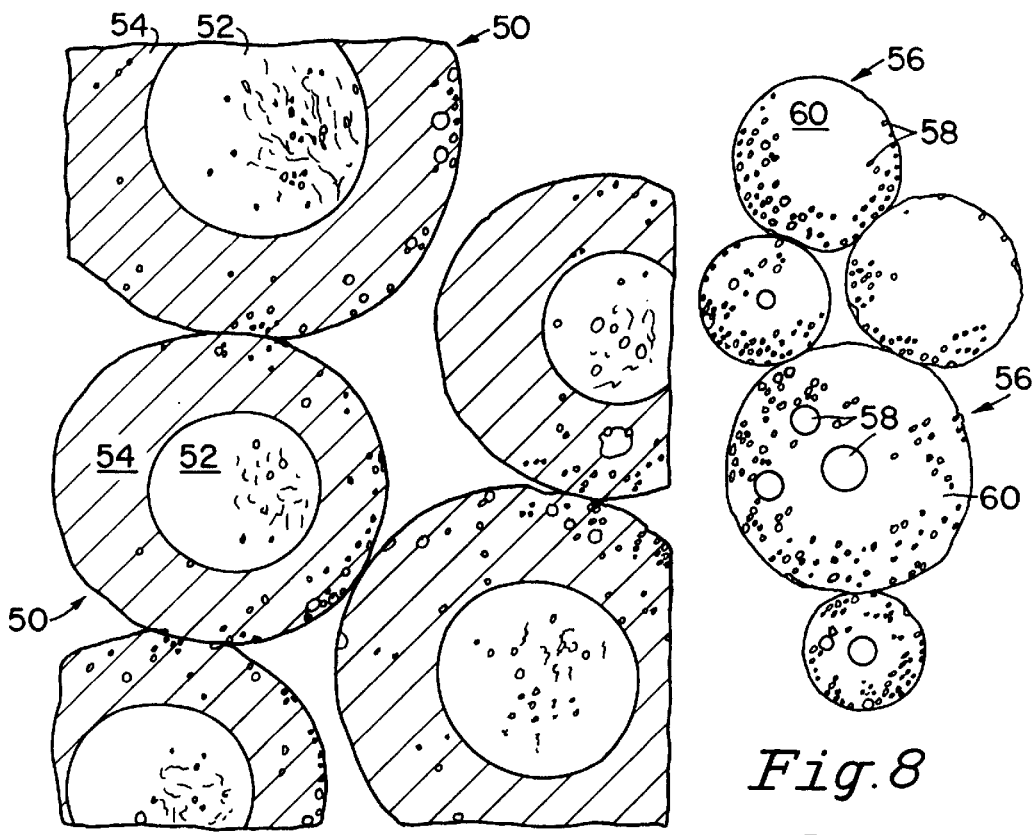
Fig.7
Fig.8
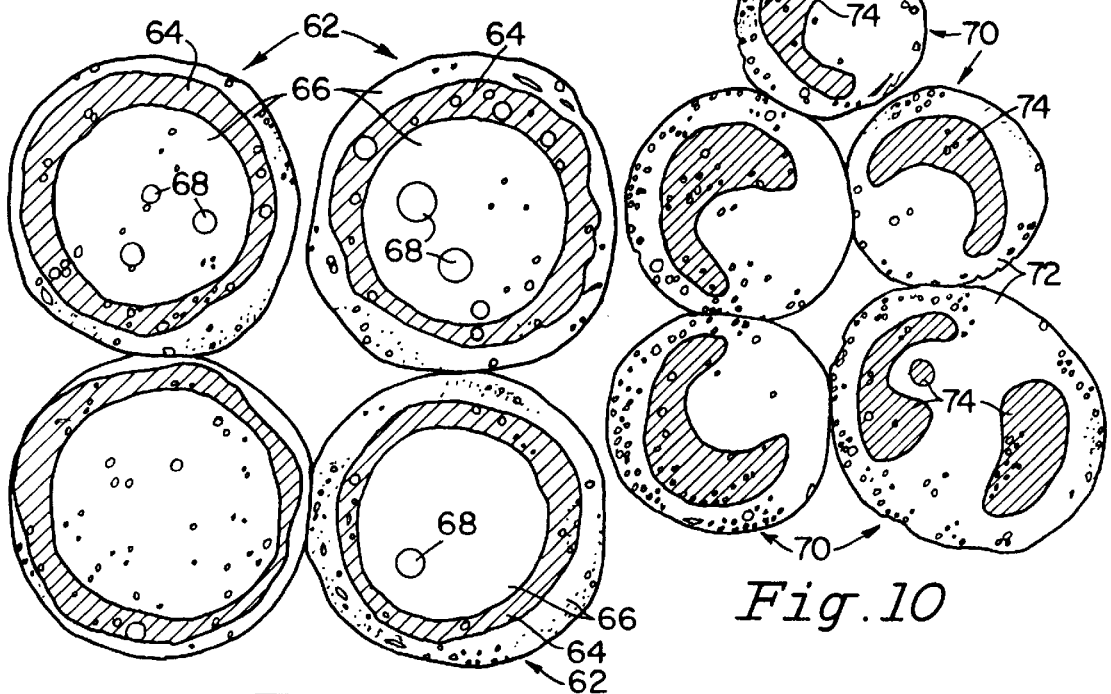
Fig.9
Fig.10

METHOD OF SEPARATING POLYMERS FROM MIXTURES THEREOF

This application is a Continuation-in-part of U.S. Ser. No. 08/337,208, filed Nov. 8, 1994 now abandoned.

BACKGROUND OF THE INVENTION

This invention relates to a method of separating immiscible polymers from mixtures thereof. More particularly, this invention relates to a method of separating immiscible polymers from liquid mixtures thereof based on melt viscosity differences and interfacial tensions existing between the polymers, and further to the use of said method in recycling mixed polymer waste.

Recycling waste into useful materials is a growing goal in modern society, particularly in the plastics and fibers industries. Landfills are becoming filled to capacity and new sites are hard to find because of zoning regulations and neighborhood concerns. Recycling waste is also important because of the growing global depletion of raw materials needed to make fresh material.

Polymer waste, often made from petroleum products, is a fertile area for recycling. Man-made polymers generally do not degrade quickly and petroleum will eventually be depleted. Thus far, mixed polymer waste, particularly mixed polymer waste containing immiscible polymers, have posed unique recycling problems. For example, while, in many cases, the immiscible polymers individually can be readily recycled, mixtures of the same immiscible polymers are not easily recycled, e.g., do not readily spin into yarn.

Immiscible polymer blends generally exhibit multiple melting points and form liquid dispersions which appear as a heterogenous mixture when viewed under a microscope. Such immiscible mixtures often have poor adhesion between the phases. The morphology of these dispersions can present certain challenges in forming the mixture into articles such as fibers as the morphology adversely affects the spinning and drawing processes. For example, some dispersions of immiscible polymers display a morphology where one polymer forms globules that are surrounded by the other polymer. The size and shape of these globules affect the properties of the final yarn. Excessively large globules can make fiber spinning virtually impossible and, even if spinning is achieved, can make drawing the fibers quite difficult. In general, the globules must be significantly smaller than the spinneret capillary diameter for the mixture to flow in a nearly homogenous manner. In the best case, the spun fiber will contain long fibrils that deform along with the matrix polymer. In the worst case, the blend will contain large globules that are rigid during drawing.

Methods of recycling polymer blends are known and are discussed, for example, in Clemson University Professional Development Seminar, "Thermoplastic Waste Reclamation", Feb. 9–10, 1993; Kaminsky, W., "Recycling of Polymeric Materials by Pyrolysis", Makromol. Chem., Macromol. Symp. 48/49, pp. 381–393 (1991); and Chemical Week, "Honing Technology to Improve Economics", Dec. 18/25, 1991. "Plastic lumber" extruded from a mixture of post-consumer polymers is known, but such usage is limited and does not solve the problem of excessive amounts of plastic waste. Incineration or "thermal recycling" produces energy from polymer mixtures but at the same time destroys the resource and may present environmental and health hazards.

Because recycling polymer mixtures according to current methods is both difficult and expensive, it would be desirable to provide a mixed polymer recycling method that is less expensive and avoids the problems encountered in the current methods. Because recycling the individual polymers is easier than recycling the mixture of the polymers, it would be further desirable to provide a method of recycling the mixture that involves recycling the individual polymers.

Recycling the individual polymers in a polymer mixture would involve separating the polymers from the mixture. Current polymer separation processes usually involve mechanical separation, chemical separation or a mixture of these approaches. However, these processes are difficult and expensive to operate.

Mechanical separation of polymer solids involves size and density-based techniques using instruments such as cyclones and screen classifiers. These instruments require solids to be physically distinct particles. Thus, solid polymer mixtures must be ground to sizes that will readily break into the individual polymer component particles. While there are instruments which can do this, grinding polymer mixtures to the individual polymer particles is difficult and generally expensive, often requiring cryogenic processes.

It would be desirable, therefore, to provide a method of recycling polymer mixtures which involves separation of the individual polymers from the mixtures, wherein the polymer separation does not require grinding the polymer mixture into particles of the individual polymers.

One drawback to many chemical separation processes is the use of significant amounts of organic solvent, which is undesirable for environmental reasons and for the waste involved in removing solvents from the polymers after separation. Examples of methods which use organic solvents to chemically separate nylon and PET from mixtures thereof are disclosed, for example, in U.S. Pat. Nos. 5,241,066 and 5,264,536.

Therefore, it is desirable to provide a method of recycling polymer mixtures which involves separation of the individual polymers, wherein polymer separation does not require significant amounts of organic solvent.

Current extrusion processes use a single extruder. In these processes, extruding a two-component blend would require a second extruder and, in the case of fiber spinning, modification of the spinning beam, to accommodate the two polymer flows. It would be desirable to provide a more economical two-component extrusion process which would require only a single extruder and, in fiber spinning processes, no modification of the spinning beam.

It would also be desirable to recycle polymer mixtures by converting these mixtures into sheath/core bicomponent fibers. Sheath/core fibers are desirable because such fibers can offer a combination of properties not normally obtained from a monocomponent fiber. For example, sheath/core bicomponent fibers have been especially useful in applications requiring fibers which have both softness and mechanical strength properties. Such applications include, for example, anti-staining fibers which are resistant to acid dyes and self-crimping yarns. Fibers used in such applications typically contain a sheath component which provides the softness and/or the acid-stain-resistant properties and a core component which provides the mechanical properties.

Bicomponent sheath/core fibers which are resistant to acid dyes usually contain polyamide. In particular, such fibers typically contain the polyamide in the sheath phase thereof. Thus, in the case of a mixed liquid stream composed of a polyamide and a second immiscible polymer component having a lower melt viscosity than does the polyamide or in the case of any mixed liquid stream composed of two immiscible melt viscosity-differing thermoplastic polymer components, it is desired to provide a method of separating the polymers from the liquid mixture thereof to form a sheath/core bicomponent fiber wherein the sheath is composed of the higher viscosity polymer component and the core is composed of the lower viscosity polymer component.

Methods of separating polymers having different melt viscosity values are disclosed, e.g., in U.S. Pat. Nos. 4,014,789 (Marshall et al.) and 3,726,955 (Hughes et al.), and in White et al., "Theory of Interface Distortion in Stratified Two-Phase Flow", Transactions of the Society of Rheology, 19:3, pp. 457–479 (1975). In addition, the separation of melt viscosity-differing polymers is discussed in U.S. Pat. No. 4,629,596 (Coffman). However, none of the aforementioned references teaches or suggests the separation of melt viscosity-differing polymers from mixtures thereof to form sheath/core bicomponent fibers wherein the sheath is composed of the higher-viscosity polymer and the core is composed of the lower-viscosity polymer.

Thus, it remains continually desirable to provide a method of separating mutually immiscible, melt viscosity-differing polymer components from a mixture thereof to form a sheath/core bicomponent fiber wherein the sheath phase is composed of the higher viscosity polymer component and the core phase is composed of the lower viscosity polymer component.

It is further desirable to provide a method of separating immiscible polymers from liquid mixtures thereof wherein the locations of the polymer components in the subsequent sheath/core structure can be controlled.

It would be further desirable to form sheath/core fibers which have the same properties as conventional bicomponent fibers.

A primary object of this invention is to provide a method of separating immiscible, melt-viscosity-differing polymers from a liquid mixture thereof.

A further primary object of this invention is to provide a method of separating two immiscible, melt viscosity-differing polymer components to form two discrete and continuous phases arranged in a sheath/core configuration wherein the sheath phase is composed of the polymer component with the higher melt viscosity and the core phase is composed of the polymer component with the lower melt viscosity.

Another object of this invention is to provide a method of making a sheath/core bicomponent fiber from a mixture of two immiscible, melt viscosity-differing polymer components wherein the sheath phase of the fiber is composed of the polymer component having the higher melt viscosity and the core phase is composed of the polymer component having the lower melt viscosity.

A further object of this invention is to provide a less expensive method of separating immiscible polymers from a mixture thereof.

Another object of this invention is to provide a method of separating immiscible polymers from a mixture thereof wherein separation does not require the use of significant amounts of organic solvent.

A still further object of this invention is to use the separation method described in the foregoing objects to recycle mixed polymers.

Yet another object of this invention is to provide a method of recycling immiscible polymer mixtures which takes advantage of the ease associated with recycling individual polymers.

A further object of this invention is to provide a method of making bicomponent articles, such as sheath/core bicomponent fibers, which requires the use of only one extruder.

A still further object of this invention is to provide a method of forming sheath/core bicomponent fibers other than by conventional bicomponent fiber-forming techniques known in the art.

These and other objects which are achieved according to the present invention can be readily discerned from the following description.

SUMMARY OF THE INVENTION

The present invention is based at least in part on the discovery that immiscible polymers can be separated from mixtures thereof by means of the melt viscosity differences and the interfacial tension which exist between the immiscible polymers.

Thus, in one embodiment, the present invention provides a method of separating two immiscible, melt viscosity-differing thermoplastic polymer components from a mixed liquid stream thereof, which involves the steps of:

providing the mixed liquid stream, which contains (i) less than 50% by volume of a first immiscible thermoplastic polymer component having a first melt viscosity and (ii) greater than 50% by volume of a second immiscible thermoplastic polymer component having a second melt viscosity, the second melt viscosity being greater than the first melt viscosity;

providing a shear zone; and directing the stream through the shear zone at a shear temperature and a shear rate sufficient to form a first discrete, continuous phase substantially containing the first polymer component and a second discrete, continuous phase substantially containing the second polymer component; the phases being arranged in a sheath/core configuration having a sheath substantially composed of the second phase and a core substantially composed of the first phase.

Another embodiment of the present invention is directed to a method of forming a bicomponent fiber using the separation method described hereinabove. The fiber-forming method of this invention involves extruding the mixed liquid stream (preferably in a single extruder) to form an extruded liquid mixture; directing the extruded liquid mixture through a shear zone in accordance with the separation method described hereinabove; removing the discrete and continuous phases from the shear zone as (a) a single output stream containing both phases, (b) two or more divided output streams, wherein at least one divided output stream substantially contains the first phase and at least one divided output stream substantially contains the second phase, or (c) four or more divided output streams, wherein at least two divided output streams substantially contains the first phase and at least two divided output streams substantially contains the second phase; and spinning the (a) single output stream, (b) the two or more divided output streams, or the (c) four or more divided output streams, to form the sheath/core bicomponent fiber.

A further embodiment of the present invention is directed to a method of recycling the mixed liquid stream, wherein the output stream(s) is subjected to a filament-forming process to form a filament or to an article-forming process to form an article.

As stated hereinabove, the immiscible polymer components are separated from a mixture thereof in the method of this invention on the basis the melt viscosity differences and the interfacial tension which exists between the polymers. A mechanism referred to herein as the "continuous/dispersed separation mechanism" is believed to be at work in producing the sheath/core configuration of the polymer mixture as the mixture passes through the shear zone in the method of this invention and further in determining the location of the higher and lower viscosity polymer components in the sheath/core structure. In the continuous/dispersed separation mechanism, the polymer component which is "predominant" in the mixed liquid stream (i.e., has a volume greater than 50% in the mixture) will form the "continuous" phase, while the polymer component with the lower volume (i.e., less than 50%) in the mixture is the "dispersed" phase. The dispersed phase collects into a single domain due to the immiscibility of the polymers. The driving force for the continuous/dispersed separation mechanism is the reduction of the area of contact, i.e., the interface, between the two polymer phases. The dispersed phase should be in the center of the flow because that geometry reduces the area of contact. In spite of the forces to push the dispersed phase to the outside, the force to minimize the interface between the phases is greater. On the other hand, if the volume of the dispersed phase in the mixture is greater than a certain critical level, e.g., 50% by volume, the dispersed phase will move toward the outside.

Although the methods of this invention are concerned with forming a sheath/core bicomponent article from two immiscible, melt-viscosity differing thermoplastic polymer components wherein the core phase is composed of the lower melt viscosity polymer component and the sheath phase is composed of the higher melt viscosity polymer component, it is believed that the continuous/dispersed separation mechanism described hereinabove will also work to provide a sheath/core bicomponent article wherein the lower viscosity polymer component is disposed in the sheath phase while the higher viscosity polymer component is disposed in the core phase. Such an article can be produced by using a mixed liquid stream which is predominantly composed of the lower melt viscosity polymer component rather than the higher melt viscosity polymer.

With highly immiscible polymer components, the continuous/dispersed mechanism tends to occur at relatively low viscosity differences and relatively low shear rates.

This invention is further based in part on the discovery that the above polymer separation method can be used in recycling mixed polymer waste. This invention is also based on the surprising discovery that factors which previously have been considered obstacles to recycling polymer mixtures, e.g., heterogenous polymer dispersions and poor adhesion between the polymer phases, can actually facilitate the substantial separation of the polymers and the recycling of polymer mixtures under proper conditions.

Because the method of this invention involves recycling polymer mixtures by separating polymers from mixtures thereof as described above, the method of this invention advantageously imparts uniformity to the final product.

The method of this invention also provides the advantage of requiring only one extruder to form bicomponent articles, such as bicomponent sheath/core fibers. Two immiscible polymers are fed into a single extruder to form a mixture, and the resulting mixture is passed through the shear zone. Mechanical separation of the polymers is not required because the polymers are spun directly from the shear zone.

Another benefit provided by the method of this invention is that it allows for the use of a single extruder in a process wherein two immiscible polymers are mixed, separated and then recombined to form an article, e.g., a fiber, with a desirable cross-section.

BRIEF DESCRIPTION OF THE DRAWINGS

FIG. 1 is a schematic illustration showing a useful shear zone in the form of a capillary used in the present invention.

FIG. 2 represents a perspective, cut-away view of the capillary represented in FIG. 1 showing a means useful to separate the individual polymers from each other.

FIGS. 3–5 represent cross-sections of a two-polymer mixture at various stages of the shearing process in the capillary represented in FIG. 1.

FIG. 7 is a schematic representation of an optical microscopic photograph taken of the cross-section of a monofilament sample prepared according to the method of this invention, wherein FIG. 7 shows separation into a sheath/core structure.

FIG. 8 is a schematic representation of an optical microscopic photograph taken of the cross-section of a monofilament sample prepared according to the method of this invention, wherein FIG. 8 shows failure of separation, resulting in a mixed structure.

FIG. 9 is a schematic representation of an optical microscopic photograph taken of the cross-section of a monofilament sample prepared according to the method of this invention, wherein FIG. 9 shows separation into a ring structure.

FIG. 10 is a schematic representation of an optical microscopic photograph taken of the cross-section of a monofilament sample prepared according to the method of this invention, wherein FIG. 10 shows separation into a partial sheath/core structure and a partial side-by-side structure.

FIG. 11 is a schematic representation of an optical microscopic photograph taken of the cross-section of a monofilament sample prepared according to the method of this invention, wherein

FIG. 12 is a schematic representation of an optical microscopic photograph taken of the cross-section of a monofilament sample prepared according to the method of this invention, wherein

FIG. 13 is a schematic representation of an optical microscopic photograph taken of the cross-section of a monofilament sample prepared according to the method of this invention, wherein FIG. 13 shows separation into a sheath/core structure.

DETAILED DESCRIPTION OF THE INVENTION

Figure 6:
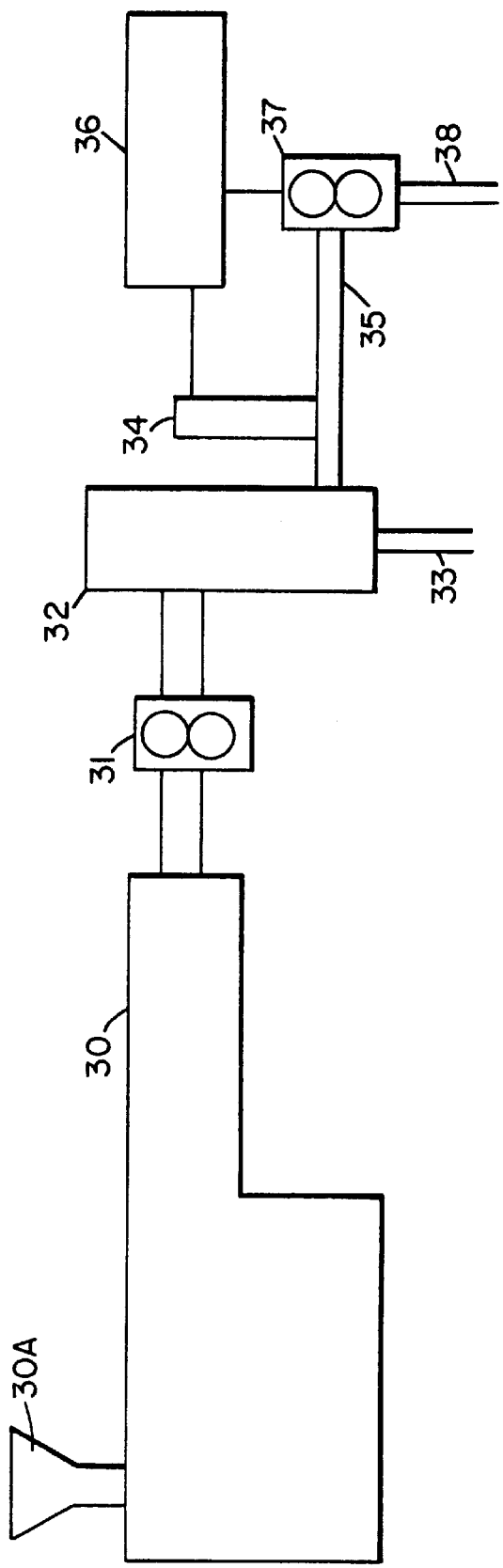
FIG. 6 is a schematic representation of the devices used in the method of the present invention, including a polymer separation detection device and a second polymer metering pump.

In the methods of this invention, two immiscible thermoplastic polymer components having different melt viscosity values are separated from a mixed liquid stream thereof. The term "immiscible" as used herein means that the polymer components are insoluble or substantially insoluble with one another. The term "polymer component" as used herein refers to one or more polymers of the same class having similar melt viscosities.

The mixed liquid stream used in the method of this invention contains a first thermoplastic polymer component which has a first melt viscosity and a second thermoplastic polymer component having a second melt viscosity, the second melt viscosity being higher than the first melt viscosity. The mixed liquid stream contains greater than 50% by volume of the second polymer component (i.e., the higher-viscosity polymer component) and less than 50% by volume of the first polymer component (i.e., the lower-viscosity polymer component). Preferably, the mixed liquid stream contains from about 60% to about 90% by volume of the second polymer component and from about 10% to about 40% by volume of the first polymer component. More preferably, the stream contains from about 75% to about 85% by volume of the second polymer component and from about 15% to about 25% by volume of the first polymer component.

In the methods of this invention, the mixed liquid stream is passed through a shear zone wherein the stream is subjected to a shearing action at a shear rate and a shear temperature sufficient to separate the first and second polymer components into first and second substantially discrete and continuous phases, respectively. The first phase substantially contains the first polymer component (i.e., the lower viscosity polymer component) and the second phase substantially contains the second polymer component (i.e., the higher viscosity polymer component). The two phases are arranged in a sheath/core configuration, wherein the core substantially contains the first phase and the sheath substantially contains the second phase. Thus, the lower viscosity polymer component will be disposed in the core and the higher viscosity polymer component will be disposed in the sheath of the sheath/core phase structure.

The formation of the discrete and continuous phases is the result of the shearing action in the shear zone. The shearing action generally causes one polymer component to move away from the central region of the shear zone and the other polymer component to move toward the central region of the shear zone. With respect to the mixed liquid stream used in the present invention, the shearing action causes the higher-viscosity polymer component to move away from the central region of the shear zone and the lower-viscosity polymer component to move toward the central region of the shear zone.

Exiting the shear zone will be two or more output streams each substantially containing one of the discrete phases or a single output stream containing substantially uniform separated phases. The term "substantially uniform" as used herein is meant to convey that each polymer component in the mixture is contained in a separate continuous phase as opposed to a plurality of discrete islands in a matrix.

Parameters which appear to be particularly important to the separation of the polymer phases in accordance with the method of this invention include the miscibility of the polymers; the melt viscosities of the polymer components; the percent volume of the polymer components; the shear rate (the linear velocity gradient through the shear zone, in reciprocal seconds, assuming viscosity is constant); and the shear temperature.

Non-limiting examples of mixtures of immiscible thermoplastic polymer components which can under polymer-separation according to the method of this invention include those polymer mixtures found in scraps resulting from fiber, yarn, fabric and plastics processing procedures, discarded consumer products, and other waste materials which are desired to be recycled. In addition, thermoplastic polymers suitable for separation in the method of this invention include those useful in fiber spinning processes. Such polymers include, for example, polyamides, polyesters, and polyolefins. Non-limiting examples of polymer mixtures which can be separated include, e.g., polyamide/polyester mixtures, polyamide/polyolefin mixtures, and polyester/polyolefin mixtures.

Non-limiting examples of specific polymer mixtures which can be separated according to the method of this invention include, for example, polycaproamide/polyethylene terephthalate, polycaproamide/polypropylene, polycaproamide/high density polyethylene; polyethylene terephthalate/polyethylene and polyethylene terephthalate/polypropylene mixtures. Such mixtures are not intended to limit the present invention as it is believed that any immiscible thermoplastic polymer mixture having melt viscosity differences can be separated according to the present invention.

Polycaproamide (nylon 6)/polyethylene mixtures, particularly polycaproamide/high density polyethylene mixtures, are particularly readily separated in the practice of the method of this invention.

In the mixed liquid stream used in the methods of this invention, the melt viscosity of the second (higher viscosity) polymer component (i.e., the "second melt viscosity") to the melt viscosity of the first (lower viscosity) polymer component (i.e., the "first melt viscosity") preferably ranges from about 1.5:1 to about 80:1, more preferably from about 1.5:1 to about 30:1, and most preferably from about 1.5:1 to about 7.0:1.

The shear zone used in the present invention preferably comprises a passage containing a liquid-contacting "shear contact region". The term "shear contact region" as used herein refers to a region in the shear zone which is in substantial contact with the mixture as the mixture passes through the shear zone, wherein the contact between the shear contact region and the passing mixture induces shear in the shear zone. The shear contact region may be, for example, a fluid or a solid surface. More preferably, the shear zone comprises a hollow orifice having an inner wall which functions as the shear contact region. Most preferably, the shear zone is a capillary, the inner wall of which acts as the shear contact region. As stated previously herein, the flow of the polymer mixture through the shear zone is preferably laminar and non-turbulent.

The shear properties of the shear zone depend on the length, diameter and cross-section shape thereof.

The length of the shear zone used in the methods of this invention will depend on the melt viscosity differences of the polymer components and on the shear rate and shear temperature used in the shear zone. Assuming that the shear rate and shear temperature are each the same, a longer shear zone is usually required to separate polymers with a lower difference in melt viscosity values than is required to separate polymers having a higher difference in melt viscosity values. However, for a given difference in melt viscosity values and a given shear temperature, higher shear rates will usually allow the use of shorter shear zones since the increase in shear rate will generally compensate for the corresponding decrease in shear zone length.

With respect to the shear zone, the term "diameter" as used herein refers to the diameter of a round cross-section or the average diameter of a non-round cross-section. The term "average diameter" as used herein refers to the average of the total diameter values in a non-round cross-section. High shear properties are typically achieved by making the shear zone long and narrow. Preferably, the shear zone will have a length-to-diameter ("L/D") ratio of from about 30:1 to about 100:1, and preferably of about 100:1.

The shear zone can have either a round or a non-round cross-section. Non-round cross-sections impart higher shear to the shear zone than do round cross-sections because the non-round cross-sections have greater surface area for contact with the mixture as the mixture passes through the shear zone. The greater the surface area in contact with the mixture as the mixture passes through the shear zone, the greater the shear. Examples of suitable non-round shapes include slot shapes, curved shapes, triangular shapes, square shapes, crescent shapes, cross shapes, star shapes, Y shapes, and the like. The end of each shear zone preferably has a small gap and a narrow opening roughly the diameter of the center concentration of the polymer mixture.

The shear zone need not necessarily be hollow as other solid surfaces over which the mixture to be separated flows can cause shear and eventual separation of the polymer phases. Thus, flat, roughened flat, corrugated, etc. surfaces can be used. Again, the degree of shear will depend on length of the shear zone and surface area of the solid surface. Furthermore, turbulence in the flow should be avoided.

The shear rate used in the method of this invention preferably ranges from about 200 to about 1100 $sec^{-1}$, more preferably from about 200 to about 900 $sec^{-1}$, and most preferably from about 300 to about 700 $sec^{-1}$.

The shear temperature used in the method of the present invention preferably ranges from about 250° C. to about 300° C., more preferably from about 270° C. to about 285° C.

Specific melt viscosity ratios, shear rates and shear temperatures which should be used in the present invention will depend at least in part on the particular polymer components used in the mixed liquid stream.

Although the melt viscosity values of the polymers are important to the method of this invention, the relative viscosity values (e.g., in the case of polycaproamides and polyesters) or the melt index values (e.g., in the case of polyolefins) are sometimes easier to measure and can be frequently relied on herein instead of melt viscosity values to determine the parameters of shear necessary for separation. Moreover, the relative viscosity of a polymer is also a measure of the polymer's molecular weight and, therefore, differences in molecular weight can be used to determine shear parameters.

When the second polymer component in the mixed liquid stream used in this invention is a polyamide, preferably polycaproamide, the polyamide has a relative viscosity of preferably from about 2.5 to about 2.9, more preferably from about 2.65 to about 2.75.

With a mixed liquid stream composed of more than 50% by volume of nylon 6 having a relative viscosity of from about 2.5 to about 2.9, and less than 50% by volume of high density polyethylene, the melt viscosity ratio of the respective melt viscosity values of the nylon 6 and the high density polyethylene preferably ranges from about 1.5:1 to about 3.25:1, more preferably from about 2.0:1 to about 3.0:1, most preferably from about 2.3:1 to about 2.8:1. The shear temperature preferably ranges from about 250° C. to about 300° C., more preferably from about 270° C. to about 285° C. The shear rate preferably ranges from about 200 $sec^{-1}$ to about 1100 $sec^{-1}$, more preferably from about 200 $sec^{-1}$ to about 900 $sec^{-1}$, most preferably from about 300 $sec^{-1}$ to about 700 $sec^{-1}$.

In the methods of this invention, the extruded liquid mixture is preferably passed through the shear zone in laminar flow fashion. Turbulence in the flow of the mixture through the shear zone should be avoided. The Reynolds value (a measure of the turbulence in the flow) of the flow is preferably less than about 4000, more preferably less than about 3000, and most preferably less than about 2000. To minimize or prevent turbulence in the flow, the inner wall of the shear zone should be smooth.

The mixture to be separated is in a liquid state prior to passing through the shear zone. The term "liquid" as used herein refers to a molten state or a molten state in admixture with a small amount of solvent so as to increase the fluidity of a portion of the polymer mixture. Preferably, the mixture is in a purely molten state with no added solvent.

Typically, the molten mixture is prepared by means of extrusion. For example, a molten polymer mixture can be prepared by feeding the mixture, typically in the form of a finely divided or granulated mixed solid, to a single screw extruder with a metering section or pump. The extruder can be any conventional laboratory-scale or full-scale screw extruder commonly used in processing thermoplastic polymers, e.g., in mixing, homogenizing, extruding, granulating, spinning and similar operations. An example of a suitable laboratory-scale extruder is an extruder having a screw diameter of one inch and depth of channel in the metering section of 0.031 inch. An example of a suitable full-scale extruder is one having a screw diameter of 3.5 inches and a metering section channel depth of 0.0938 inch. In the extruder, the mixture is subjected to a temperature sufficient to melt all components of the mixture (i.e., melting temperature). For nylon/polyester, nylon/polyolefin, and polyester/polyolefin mixtures, melting temperatures ranging from about 265° C. to about 300° C. have been found useful.

In the methods of this invention, the polymer having the higher melt viscosity and the polymer with the lower melt viscosity will flow together in the same direction through the shear contact region (e.g., a capillary). The shear contact region preferably does not move in the method of this invention. The only movements occurring in the method of this invention are preferably those of the liquid mixture and the subsequently formed discrete phases. In preferred embodiments of the present invention, a pressure differential between the higher viscosity polymer component and the lower viscosity polymer component will not exist as the mixture flows through the shear zone. For example, if the shear contact region is in the form of a round capillary, each point along the length of the capillary for the entire cross-section perpendicular to the wall of the capillary will be subject to the same pressure. In the method of this invention, the polymer having the higher melt viscosity is caused to flow toward the wall, which is the source of shear, because of the reduction of the frictional force on the flow, not because of a pressure differential.

As stated previously herein, the discrete and continuous phases formed in the shear zone in the method of this invention may exit the shear zone as either (a) a single output stream containing both of the phases; (b) two or more divided output streams, wherein at least one divided output stream substantially contains the first phase and at least one divided output stream substantially contains the second phase; or (c) four or more divided output streams, wherein at least two divided output streams substantially contains the first phase and at least two divided output streams substantially contains the second phase.

If desired, any output stream containing the first and second polymers in a sheath/core configuration can be manipulated to cause the core polymer and the sheath polymer to switch positions, i.e., the core polymer becomes the sheath polymer and the sheath polymer becomes the core polymer.

The methods of this invention may also include the steps of passing the single output stream (a), at least one of the two or more divided output streams (b), or at least one of the four or more divided output streams through one or more additional shear zones at a shear rate and a shear temperature sufficient to increase the concentration of the thermoplastic polymer component having the first melt viscosity in the first phase and to increase the concentration of the thermoplastic polymer component having the second melt viscosity in the second phase.

In addition, the methods of this invention may also include (i) combining the at least one divided output stream substantially containing the first phase and the at least one divided output stream substantially containing the second phase to form a mixture thereof; (ii) combining the at least two divided output streams substantially containing the first phase to form a mixture thereof; and/or (iii) combining the at least two divided output streams substantially containing the second phase to form a mixture thereof.

The output stream or streams can be recycled in various ways. For example, the polymer stream(s) may be directed into a spinneret and spun into thermoplastic fibers or filaments; extruded into a die and cut into resin chips; undergo continuous extrusion to form plastic parts; or undergo a combination of the foregoing methods. It is to be understood that the ways in which the polymer stream(s) can be recycled are not limited to the foregoing recited methods.

Filaments may be formed by directing the output stream (s) or output stream mixture(s) described above into a spinneret to form fibers and yarns. Plastic articles may be formed by extruding the output stream(s) or output stream mixture(s) described above into a die and cutting the extruded stream into resin chips, or by subjecting the output stream(s) or output stream mixture(s) to continuous extrusion or injection molding and the like to form plastic articles.

One or more output streams may be fiber-spun to form bicomponent or multicomponent fibers of various structures including but not limited to sheath/core fibers, side-by-side fibers, islands-in-sea fibers, and very fine fibers such as microfibers.

Another embodiment of this invention is directed to a method of forming a sheath/core bicomponent fiber within the scope of this invention, includes the steps of:

(A) providing the mixed liquid stream described previously herein;

(B) extruding, preferably in a single extruder, the mixed liquid stream to form an extruded liquid mixture;

(C) providing a shear zone as described hereinabove and passing the extruded liquid mixture through the shear zone in accordance with the separation method described hereinabove;

(D) removing the discrete and continuous phases from the shear zone as (a) a single output stream containing both phases; (b) two or more divided output streams, wherein at least one divided output stream substantially contains the first phase and at least one divided output stream substantially contains the second phase; or (c) four or more divided output streams, wherein at least two divided output streams substantially contains the first phase and at least two divided output streams substantially contains the second phase; and (E) spinning the (a) single output stream, (b) the two or more divided output streams, or the (c) four or more divided output streams, to form the sheath/core bicomponent fiber.

A particularly useful method of fiber spinning two or more output streams to form bicomponent or multicomponent fibers is disclosed in commonly assigned U.S. Pat. No. 5,162,074 to Hills, which was previously incorporated by reference herein in its entirety. Briefly, Hills teaches a method of making plural component fibers wherein a plurality of separate dissimilar molten/solution polymer components are flowed in a structure containing several parts, including a spinneret plate and at least one distributor plate. Each distributor plate has an upstream surface and a downstream surface, either or both surfaces having multiple distribution flow paths etched thereon. Each separate component is distributed through the multiple distribution flow paths to an array of inlet holes for multiple spinneret orifices in the spinneret plate. Each component flows into each inlet hole to provide in each spinneret orifice a combined flow containing each of the plural components. Through the spinneret orifices, fibers are issued from the structure. The use of the etched distributor plate can allow various intricate and complex arrangements of the polymer components to be formed in the multicomponent fiber product in addition to the conventional side-by-side arrangements.

The separation method of this invention can be further understood by reference to FIGS. 1–5. In these figures, a molten thermoplastic immiscible polymer mixture containing a first polymer component 1 (e.g., HDPE) and a second polymer component 2 (e.g., nylon 6) is fed through entry zone 3 into capillary 4 and passed therethrough. Polymer component 1 has a lower melt viscosity than does polymer component 2. During passage through the capillary 4, the mixture contacts the inner wall 5 of the capillary and undergoes shear in accordance with this invention. The shear causes the mixture to separate into discrete and continuous phases 6 and 7, wherein phase 6 substantially contains the first polymer component 1 and phase 7 substantially contains the second polymer component 2. As shown in FIG. 1, phase 6 is concentrated in central section 8 of capillary 4 and phase 7 is concentrated near inner wall 5 of the capillary.

Entry zone 3 of the capillary may have either a conical profile or a hyperbolic profile. Preferably, the entry zone will have a hyperbolic profile, because such a profile provides a uniform rate of increase in shear.

Separation of nylon and high density polyethylene from nylon/high density polyethylene blends carried out according to the method of this invention generally results in the high density polyethylene migrating toward central section 8 and the nylon migrating toward inner wall 5.

An output stream 9 substantially containing phases 6 and 7 exits capillary 4 via outlet 10 and, optionally, can be directed to a distribution plate 11 or spun directly to form a fiber. As can be seen in FIG. 2, plate 11 includes a central hollow orifice 12, which has a smaller diameter than outlet 10 of capillary 4, and sidestream distribution channels 13 and 14. Plate 11 divides the output stream 9 into a central core stream 15 and an outer sheath stream which can be removed as sidestreams 16 and 17 in sidestream distribution channels 13 and 14. The size of orifice 12 of distribution plate 11 will determine the concentration of the separated polymer streams. For example, a smaller orifice causes central core stream 15 to contain a higher concentration, e.g., 100%, of polymer component 1 and a lower or zero concentration of polymer component 2. A larger orifice 12 will result in central core stream 15 containing an increasing portion of polymer component 2.

Central core stream 15 and the outer sheath stream such as through sidestreams 16 and 17 may each be directed into additional capillaries (not shown) for further separation of polymer component 1 and polymer component 2.

It is to be understood that although FIG. 1 depicts removal of the polymer mixture from the shear zone at the last stage, i.e., the stage represented at line 20—20, of the process, the mixture can be removed at earlier stages, i.e., stages represented at lines 18—18 and 19—19, respectively, of the process if one of the polymer components is present as a discrete, and continuous phase containing none or insubstantial amounts of the other polymer component. The discrete polymer phase can be removed from the mixture, and the remaining portion of the mixture can be subjected to further shearing. Furthermore, a distribution plate, such as plate 11, can be used at an earlier stage of the shear zone if a discrete and continuous phase has been formed by that stage and is desired to be removed from the mixture.

FIGS. 3–5 respectively depict cross-sections of the polymer mixture at an early stage shown at line 18—18, an intermediate stage shown at line 19—19 and the final stage shown at line 20—20 of the shearing process in the capillary 4. FIG. 3 shows the cross-section obtained at the early stage shown at line 18—18, wherein the first polymer component 1 is present as relatively small islands in a sea of the second polymer component 2. FIG. 4 shows the cross-section obtained at the intermediate stage shown at line 19—19, wherein the first polymer component 1 is present as large globules in a matrix of the second polymer component 2. FIG. 5 shows the cross-section obtained at the final stage shown at line 20—20, wherein the first polymer component 1 (i.e., the lower viscosity polymer component) is present as a core surrounded by a sheath of the second polymer component 2 (i.e., the higher viscosity polymer component).

The method of this invention preferably includes the steps of using a polymer separation detection device or sensor on one or more output streams, and using a second polymer metering pump in contact with the sensor through a speed control device to control the flow rate of the output streams. The use of such a sensor and second polymer metering pump is illustrated in FIG. 6. In FIG. 6, polymers fed into an extruder 30 through a hopper 30A are extruded to form a molten polymer mixture. After extrusion, the polymer mixture passes through a first polymer metering pump 31, which controls the flow rate of the polymer mixture. The mixture enters assembly 32, usually a spin pack assembly, which may contain a filtration system typically made up of wire screens, sand, shattered metal, or sintered metal. The assembly 32 further contains a shear zone preferably made up of one or more capillaries. The polymer mixture undergoes shear in the shear zone to form separate phases (preferably sheath/core phases) in accordance with the method of this invention. Output stream 33 and output stream 35 may exit the shear zone. The sheath polymer phase and the core polymer phase can be in either output stream. A sensor 34 may be in contact with one of the output streams, e.g., output stream 35. An additional sensor (not shown) is preferably also in contact with the other output stream. The sensor 34 can be connected to a speed control device 36 which in turn is connected to a second polymer metering pump 37. The second polymer metering pump 37 controls the flow rate of the core and sheath polymer streams. The sensor 34 detects the amount of each polymer in an output stream, e.g., output stream 35. If the composition of the output stream needs to be adjusted, the sensor signals the speed control device 36 to cause the second polymer metering pump 37 to increase or decrease, as needed, the flow rates of the polymer streams. Output stream 38 should then be made up of substantially either the sheath or the core polymer component. For example, if a mixed polymer liquid stream containing 60 grams of sheath-forming polymer component and 40 grams of core-forming polymer component flows into the shear zone at a flow rate of 100 grams/minute (which is achieved by means of the first polymer metering pump 31), and the core output stream (e.g., output stream 35) is detected by the sensor as containing 40 grams of core polymer component and 5 grams of sheath polymer component for a flow rate of 45 grams/minute, the second polymer metering pump 37 will decrease the flow rate of the core output stream to 40 grams/minute which in turn will cause the sheath output stream to increase by 5 grams per minute (the 5 additional grams being the 5 grams of sheath polymer component originally in the core output stream). The sum of the flow rates of the output streams will equal the flow rate of the polymer mixture into the shear zone.

Thus, the use of the sensor and second polymer metering pump provides control of the composition of the output streams and thereby ensures that on-line quality control of the degree of separation is possible. With the sensor and second polymer metering pump, different separation geometries (e.g., channel size or pressure drop experienced by the polymer components) will not be required for different ratios of viscosity and component ratios. In other words, without the sensor and second pump, the amount of each polymer in the output streams will depend on the rheology of the polymer mixture and the conditions within the shear zone. The use of a sensor and a second polymer metering pump to control output stream composition is less time-consuming, more flexible and less expensive.

The sensor can be an infrared or near-infrared spectrometer. To determine output stream composition, the sensor may measure color, capacitance, pressure drop, infrared spectrum, or other like properties of the output stream.

The present invention will be described in more detail by way of the following examples but it should not be construed to be limited thereto.

EXPERIMENTAL

Examples 1–32

Examples 1–32 illustrate the effect of various parameters on the degree to which immiscible polymers in a mixture will separate into a sheath/core structure.

The following terms used in the examples and tables below are defined as follows:

"N6"—nylon 6
"HDPE"—high density polyethylene
"RV"—relative viscosity
"MV"—melt viscosity
"Sep. Desc."—separation description
"S/C"—sheath/core structure, wherein the core is HDPE and the sheath is nylon 6, see FIG. 7 for illustration
"M"—mixed, see FIG. 8 for illustration
"R"—ring structure—see FIG. 9 for illustration
"P"—structure which is partially sheath/core and partially side-by-side in nature, see FIG. 10 for illustration The HDPE/nylon 6 mixture samples used in Examples 1–32 were obtained as follows. Two mixtures of high density polyethylene (HDPE) and nylon 6 were prepared by blending HDPE (24 grams, 20% by weight) and dry nylon chips (96 grams, 80% by weight) in a clean, clear plastic bag. The nylon 6 had a relative viscosity (RV) of about 2.7 in one mixture and a relative viscosity of about 3.3 in the other mixture. The HDPE in both mixtures had a melt flow index of about 31.5. Sixteen samples were taken from each mixture, for a total of 32 samples. Each sample was placed in a glass bottle (one bottle per rheometer experiment) and dried in a vacuum oven at 100° F. for 24 hours. A piston rheometer having an L/D ratio of 30:1 and a 0.5 mm die was set to a temperature of 270° C. or 285° C. After the rheometer reached the set temperature, the dry polymer mixture samples were placed therein and allowed to melt for two minutes longer than usual. The samples were then extruded in the rheometer at the shear rates recited in Tables I–IV hereinbelow.

Fibers were directly collected from several of the extruded samples and optical microscopic photographs were taken of the fiber cross-sections. Schematic illustrations of the photographs taken of most of the fiber-cross sections obtained in the examples are presented in FIGS. 7–10.

The relative viscosity of the nylon 6 was 2.7 in Examples 1–16 and 3.3 in Examples 17–32. Examples 1–8 and 17–24 used a shear temperature of 270° C., while Examples 9–16 and 25–32 used a shear temperature of 285° C. Tables I–IV below further set forth other parameters used in the examples. In addition, Tables I–IV recite the figure which represents the schematic illustration of the fiber cross-section photograph obtained in the corresponding example.

TABLE I

Examples 1–8: N6-RV:2.7; 270° C.

| Ex. # | Shear Rate (1/sec) | MV N6 (Pa-Sec) | MV HDPE (Pa-Sec) | MVR N6: HDPE | MV N6/HDPE Mixture | Sep. Des. | FIG. # |
|---|---|---|---|---|---|---|---|
| 1 | 200 | 270 | 102 | 2.65 | 93.96 | S/C | 7 |
| 2 | 300 | 269 | 101 | 2.66 | 105.75 | S/C | 7 |
| 3 | 500 | 251 | 95 | 2.64 | 96.3 | S/C | 7 |
| 4 | 700 | 235 | 89 | 2.64 | 85.52 | S/C | 7 |
| 5 | 900 | 217 | 83 | 2.61 | 75.75 | P | 10 |
| 6 | 1100 | 205 | 78 | 2.63 | 66.97 | P | 10 |
| 7 | 1300 | 197 | 74 | 2.66 | 58.59 | P | 10 |
| 8 | 2000 | 180 | 68 | 2.65 | 49.71 | P | 10 |

TABLE II

Examples 9–16: N6-RV:2.7; 285° C.

| Ex. # | Shear Rate (1/sec) | MV N6 (Pa-Sec) | MV HDPE (Pa-Sec) | MVR N6: HDPE | MV N6/HDPE Mixture | Sep. Des. | FIG. # |
|---|---|---|---|---|---|---|---|
| 9 | 200 | 225 | 96 | 2.34 | 80.05 | S/C | 7 |
| 10 | 300 | 228 | 92 | 2.48 | 74.09 | S/C | 7 |
| 11 | 500 | 221 | 83 | 2.66 | 59.94 | S/C | 7 |
| 12 | 700 | 214 | 79 | 2.71 | 57.46 | S/C | 7 |
| 13 | 900 | 202 | 73 | 2.77 | 70.97 | S/C | 7 |
| 14 | 1100 | 194 | 64 | 3.03 | 64.23 | S/C | 7 |
| 15 | 1300 | 187 | 62 | 3.02 | 58.03 | P | 10 |
| 16 | 2000 | 165 | 61 | 2.70 | 44.7 | P | 10 |

TABLE III

Examples 17–24: N6-RV:3.3; 270° C.

| Ex. # | Shear Rate (1/sec) | MV N6 (Pa-Sec) | MV HDPE (Pa-Sec) | MVR N6: HDPE | MV N6/HDPE Mixture | Sep. Des. | FIG. # |
|---|---|---|---|---|---|---|---|
| 17 | 200 | 780 | 102 | 7.65 | 131.34 | P | 10 |
| 18 | 300 | 703 | 101 | 6.96 | 121.86 | S/C | 7 |
| 19 | 500 | 595 | 95 | 6.26 | 89.41 | R | 9 |
| 20 | 700 | 529 | 89 | 5.94 | 82.54 | S/C | 7 |
| 21 | 900 | 475 | 83 | 5.72 | 71.18 | R | 9 |

TABLE III-continued

Examples 17–24: N6-RV:3.3; 270° C.

| Ex. # | Shear Rate (1/sec) | MV N6 (Pa-Sec) | MV HDPE (Pa-Sec) | MVR N6: HDPE | MV N6/HDPE Mixture | Sep. Des. | FIG. # |
|---|---|---|---|---|---|---|---|
| 22 | 1100 | 424 | 78 | 5.44 | 67.35 | R | 9 |
| 23 | 1300 | 412 | 74 | 5.57 | 54.09 | R | 9 |
| 24 | 2000 | 389 | 68 | 5.72 | 47.99 | R, S/C | —[a] |

[a]cross-section contains both sheath/core and ring structures

TABLE IV

Examples 25–32: N6-RV:3.3; 285° C.

| Ex. # | Shear Rate (1/sec) | MV N6 (Pa-Sec) | MV HDPE (Pa-Sec) | MVR N6: HDPE | MV N6/HDPE Mixture | Sep. Des. | FIG. # |
|---|---|---|---|---|---|---|---|
| 25 | 200 | 553 | 96 | 5.76 | 159.1 | M | 8 |
| 26 | 300 | 472 | 92 | 5.13 | 131.44 | S/C | 7 |
| 27 | 500 | 353 | 83 | 4.25 | 82.68 | P | 10 |
| 28 | 700 | 303 | 79 | 3.84 | 75.83 | P,R | —[b] |
| 29 | 900 | 280 | 73 | 3.84 | 65.84 | R | 9 |
| 30 | 1100 | 276 | 64 | 4.31 | 61.57 | P,R | —[b] |
| 31 | 1300 | 251 | 62 | 4.05 | 49.93 | R | 9 |
| 32 | 2000 | 242 | 61 | 3.97 | 42.25 | P,R | —[b] |

[b]cross-section contains both partial sheath/core and ring structures

FIG. 7 represents sheath/core bicomponent fibers 50 wherein the HDPE component forms the core 52 and the nylon 6 component forms the sheath 54.

FIG. 8 represents bicomponent fibers 56 having a "mixed" structure, wherein globules 58 of the HDPE component are disposed in a matrix 60 of the nylon 6 component.

FIG. 9 represents bicomponent fibers 62 having a "ring" structure wherein the HDPE component is disposed as rings 64 and globules 68 in a matrix 66 of the nylon 6 component.

FIG. 10 represents bicomponent fibers 70 having a partially sheath/core structure and a partially side-by-side structure, wherein the HDPE component is disposed as globules 74 in a matrix 72 of the nylon 6 component.

The results presented in Tables I–IV and in FIGS. 7–10 show that the most complete polymer separation to form bicomponent fiber sheath/core structures occurs at low melt viscosity values and low shear rates. Higher melt viscosity values and higher shear rates tend to result in incomplete separation as evidenced by fiber cross-sections having a partial sheath/core, ring, or mixed structure. Thus, Examples 1–32 and FIGS. 7–10 show that the most complete separation of a polymer mixture containing 80% by weight nylon 6 and 20% by weight high density polyethylene is achieved by means of the continuous/dispersed separation mechanism discussed previously herein, which results in the nylon 6 being disposed in the sheath and the high density polyethylene being disposed in the core of the sheath/core configuration.

Examples 33–37

Examples 33–37 illustrate how melt mixtures having varying concentrations of HDPE and nylon 6 (relative viscosity of 2.7) separate into a sheath/core structure. The HDPE and nylon 6 were each first ground into a fine powder and dried separately in a vacuum oven at about 120° F. for approximately 12 hours in glass containers.

Mixtures of the HDPE and nylon 6 were prepared by blending 30-gram samples of each component in a clean, clear plastic bag as follows:

Example 33: 0% by weight of HDPE; 100% by weight of nylon 6 (30.00 grams of nylon 6)

Example 34: 20% by weight of HDPE; 80% by weight of nylon 6 (6.00 grams of HDPE, 24.00 grams of nylon 6)

Example 35: 50% by weight of HDPE; 50% by weight of nylon 6 (15.00 grams of HDPE, 15.00 grams of nylon 6)

Example 36: 80% by weight of HDPE; 20% by weight of nylon 6 (24.00 grams of HDPE, 6.00 grams of nylon 6)

Example 37: 100% by weight of HDPE; 0% by weight of nylon 6 (30.00 grams of HDPE)

A piston rheometer having an L/D ratio of 30:1 and a 0.5 mm die was set to a temperature of about 270° C. After the rheometer reached the set temperature, the dry polymer mixture samples were placed therein and allowed to melt. The samples were then extruded in the rheometer at the shear rate of 700 sec$^{-1}$. This shear rate was chosen because, as shown in Table I herein, it provides a good sheath/core separation for the HDPE/nylon 6 sample containing 20% by weight of the HDPE and 80% by weight of the nylon 6. Fibers were directly collected from several of the extruded samples and optical microscopic photographs of the fiber cross sections were taken at a magnification of 60× (see FIGS. 11–13). Table V hereinbelow shows the viscosity data for these samples.

Figure 11:
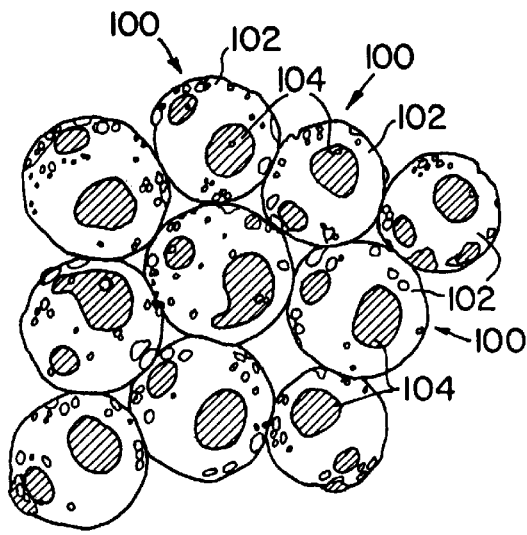
Figure 12:
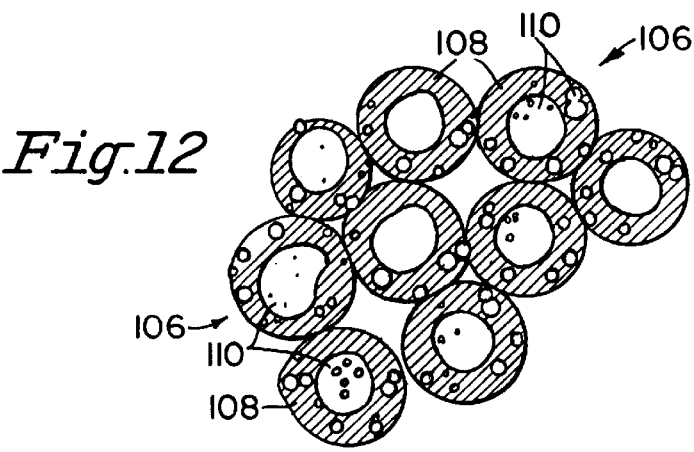
FIG. 12 shows separation into a sheath/core structure.
Figure 13:
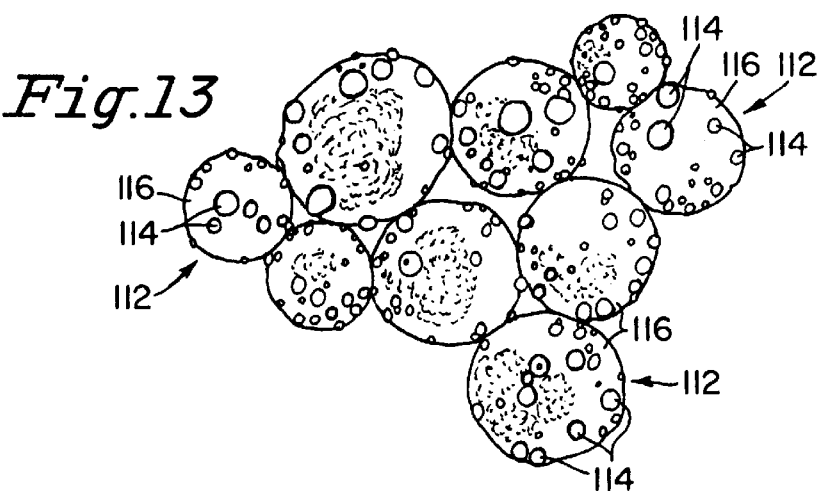

In FIG. 11, the bicomponent fiber 100 has a developing sheath/core configuration, wherein the sheath 102 contains the nylon 6 component and the core 104 contains the HDPE component. In FIG. 12, the bicomponent fiber 106 substantially has a sheath/core configuration wherein the sheath 108 is composed of the HDPE component and the core 110 is composed of the nylon 6. In FIG. 13, the bicomponent fiber 112 has an islands-in-the-sea structure wherein the islands 114 are composed of the nylon 6 component and the sea 116 is composed of the HDPE component.

Figure 14:
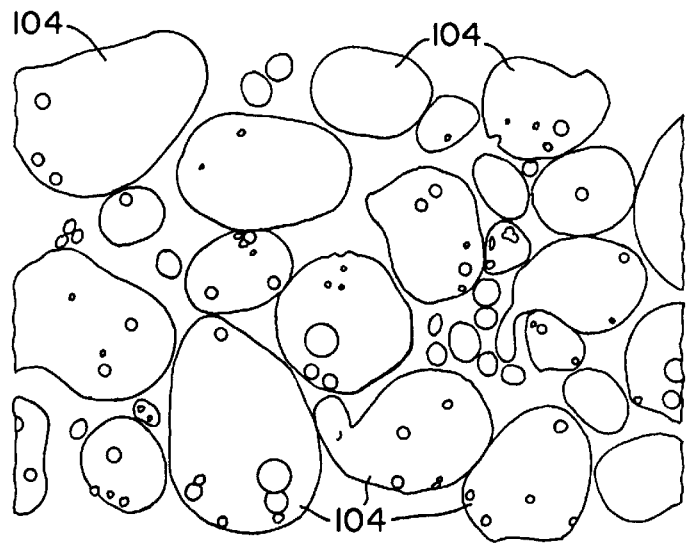
FIG. 14 is a schematic representation of an optical microscopic photograph taken of the cross-section of the monofilament sample shown in FIG. 11 after the monofilament sample has been treated with formic acid to dissolve away the nylon 6 component.
Figure 15:
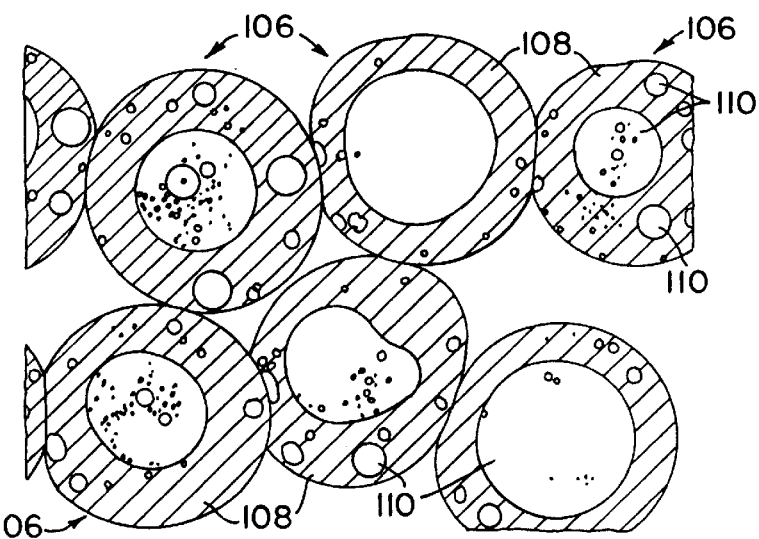
FIG. 15 is a schematic representation of an optical microscopic photograph taken of the cross-section of the monofilament sample shown in FIG. 12 after the monofilament sample has been treated with formic acid to dissolve away the nylon 6 component.
Figure 16:
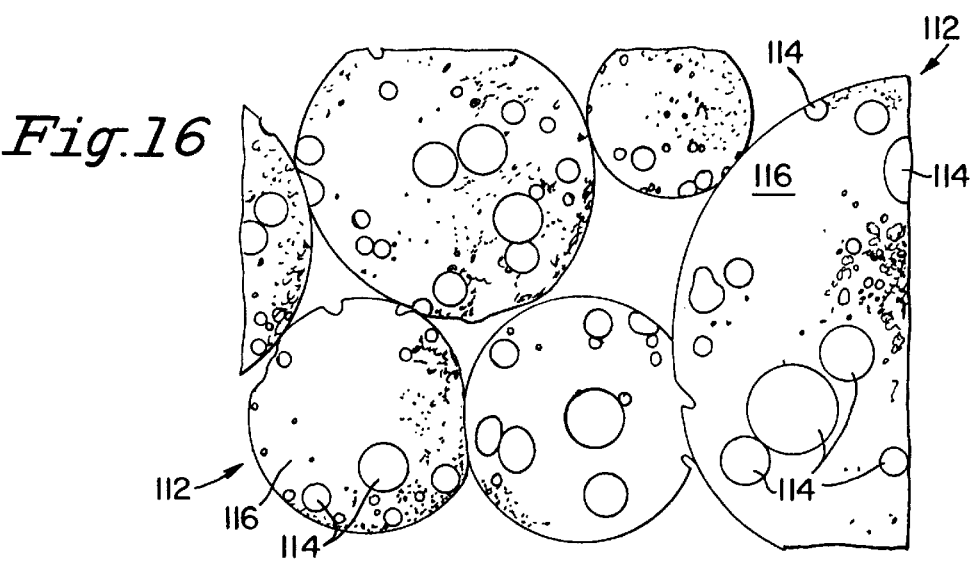
FIG. 16 is a schematic representation of an optical microscopic photograph taken of the cross-section of the monofilament sample shown in FIG. 13 after the monofilament sample has been treated with formic acid to dissolve away the nylon 6 component.

A "bico" test was performed on the samples prepared in Examples 34, 35 and 36 to determine the location of the nylon 6 component in the fiber cross section. In the "bico" test, 0.1 gram of each fiber sample was weighed initially and then dissolved in 100 ml of 90% formic acid at room temperature in a stirred glass flask. The resulting residue was washed twice in 25 ml of formic acid, then washed twice in 50 ml of methanol, and then dried for 3 hours at 100° C. The results are given in Table V below as % by weight of nylon 6 dissolved. Microscopic photographs at 120× magnification were made of the sample residues and are shown in FIGS. 14–16.

TABLE V

Examples 33–37: HDPE/Nylon 6 Fibers
Shear rate = 700 sec$^{-1}$, Temperature = 270° C.

| Example No. | HDPE % by wt. | N6 % by wt. | MV Pa-Sec | Bico Test % N6 | FIG. # |
|---|---|---|---|---|---|
| 33 | 0 | 100 | 148.8 | N/A | N/A |
| 34 | 20 | 80 | 78.4 | 71.4 | 11,14 |
| 35 | 50 | 50 | 62.3 | 5.8 | 12,15 |
| 36 | 80 | 20 | 62.8 | 7.9 | 13,16 |
| 37 | 100 | 0 | 67.4 | N/A | N/A |

The results shown in Table V appear to confirm the "continuous/dispersed mechanism" theory discussed previously herein. As shown in FIG. 14, in the bicomponent fiber 100 of Example 34 which contained 20% by weight of the HDPE and 80% by weight of the nylon 6, the formic acid dissolved the nylon 6 sheath 102 and left the HDPE core 104. The amount of nylon 6 dissolved away in Example 34 was 71.4% by weight. As shown in FIG. 15, the bicomponent fiber 106 of Example 35, which contained 50% by weight of each the HDPE and the nylon 6, the formic acid could not reach the nylon 6 core 110 because the core was encapsulated by the HDPE sheath 108. Thus, only about 5.8% by weight of the nylon 6 was dissolved away in Example 35. As can be seen in FIG. 16, the bicomponent fiber 112 of Example 36, which contained 80% by weight of the HDPE and 20% by weight of the nylon 6, the HDPE sea 116 encapsulated the nylon 6 islands 114 and thus the formic acid could not reach the nylon 6 islands 114.

Thus, the results shown in Table V and in FIGS. 11–16 indicate that at HDPE concentrations of less than 50% by volume, the lower-viscosity HDPE (which forms the dispersed phase) migrates toward the core and the higher-viscosity nylon 6 (which forms the continuous phase) migrates toward the sheath. The results also indicate that at concentrations of approximating equal volume amounts of each polymer component (approximately 50% by volume of HDPE and 50% by volume of the nylon 6), the opposite effect is observed. In this case, the lower viscosity HDPE polymer component migrates toward the sheath and the higher viscosity nylon 6 polymer component migrates toward the core such that the lower viscosity polymer component encapsulates the higher viscosity polymer component.

What is claimed is:

1. A method of separating two mutually immiscible, melt-viscosity-differing thermoplastic polymer components from a mixed liquid stream thereof, comprising:

providing a solid polymer mixture and converting it into a mixed liquid stream, said stream containing (i) less than 50% by volume of a first immiscible thermoplastic polymer component having a first melt viscosity and (ii) greater than 50% by volume of a second immiscible thermoplastic polymer component having a second melt viscosity, the second melt viscosity being greater than the first melt viscosity;

providing a shear zone; and directing said stream through said shear zone at a shear temperature and a shear rate sufficient to form a first discrete, continuous phase substantially comprising the first polymer component and a second discrete, continuous phase substantially comprising the second polymer component; the phases being arranged in a sheath/core configuration having a sheath substantially comprising the second phase and a core substantially comprising the first phase.

2. A method according to claim 1, wherein said stream comprises from about 10% to about 40% by volume of said first polymer component and from about 60% to about 90% by volume of said second polymer component.

3. A method according to claim 2, wherein said stream comprises from about 15% to about 25% by volume of said first polymer component and from about 75% to about 85% by volume of said second polymer component.

4. A method according to claim 1, wherein a melt viscosity ratio of the second melt viscosity to the first melt viscosity ranges from about 1.5:1 to about 80:1.

5. A method according to claim 4, wherein the melt viscosity ratio ranges from about 1.5:1 to about 7.0:1.

6. A method according to claim 1, wherein said shear temperature ranges from about 250° C. to about 300° C.

7. A method according to claim 1, wherein said shear rate ranges from about 200 to about 1100 sec$^{-1}$.

8. A method according to claim 1, wherein the shear zone has a length-to-diameter ratio of from about 30:1 to about 100:1.

9. A method according to claim 1, wherein the shear zone comprises a passage containing a liquid-contacting shear contact region.

10. A method according to claim 9, wherein the shear zone comprises a hollow orifice having an inner wall, wherein the inner wall is the liquid-contacting shear contact region.

11. A method according to claim 10, wherein the hollow orifice is a capillary.

12. A method according to claim 1, wherein the mixed liquid stream flows through the shear zone in a laminar fashion.

13. A method according to claim 12, wherein flow of the mixed liquid stream through the shear zone has a Reynolds value of less than about 4000.

14. A method according to claim 1, wherein a pressure differential between the first and second polymer components does not exist as the mixed liquid stream flows through the shear zone.

15. A method according to claim 1, wherein the first and second immiscible thermoplastic polymer components are each selected from the group consisting of polyamides, polyesters and polyolefins.

16. A method according to claim 15, wherein the first thermoplastic polymer component is a polyolefin and the second thermoplastic polymer component is a polyamide.

17. A method according to claim 16, wherein the polyamide is polycaproamide and the polyolefin is high density polyethylene.

18. A method according to claim 17, wherein the polycaproamide has a relative viscosity of from about 2.5 to about 2.9.

19. A method according to claim 18, wherein the high density polyethylene has a first melt viscosity and the polycaproamide has a second melt viscosity such that a ratio of the second melt viscosity to the first melt viscosity ranges from about 1.5:1 to about 3.25:1.

20. A method according to claim 19, wherein the ratio ranges from about 2.0:1 to about 3.0:1.

21. A method according to claim 19, wherein said shear temperature ranges from about 270° C. to about 285° C.

22. A method according to claim 21, wherein said shear rate ranges from about 200 to about 1100 sec$^{-1}$.

23. A method according to claim 22, wherein said shear rate ranges from about 200 to about 900 sec$^{-1}$.

24. A method according to claim 23, wherein said shear rate ranges from about 300 to about 700 sec$^{-1}$.

25. A method according to claim 1, wherein the first and second discrete and continuous phases exit the shear zone as (a) a single output stream comprising both of the phases; (b) two or more divided output streams, wherein at least one divided output stream substantially comprises the first phase and at least one divided output stream substantially comprises the second phase; or (c) four or more divided output streams, wherein at least two divided output streams substantially comprises the first phase and at least two divided output streams substantially comprises the second phase.

26. A method according to claim 25, further comprising subjecting the (a) the single output stream; (b) the two or more divided output streams; or (c) the four or more divided output streams, to a filament-forming or article-forming process to form a filament or article, respectively.

27. A method of separating two mutually immiscible, melt-viscosity-differing thermoplastic polymer components from a mixed liquid stream thereof, comprising:

(A) providing a mixed liquid stream comprising (i) less than 50% by volume of a first immiscible thermoplastic polymer component having a first melt viscosity and (ii) greater than 50% by volume of a second immiscible thermoplastic polymer component having a second melt viscosity, the second melt viscosity being greater than the first melt viscosity;

(B) providing a shear zone;

(C) directing the mixed liquid stream through the shear zone at a shear temperature and a shear rate sufficient to form a first discrete, continuous phase substantially comprising the first polymer component and a second discrete, continuous phase substantially comprising the second polymer component, the phases being arranged in a sheath/core configuration having a sheath substantially comprising the second phase and a core substantially comprising the first phase;

(D) removing the first and second discrete, continuous phases from the shear zone as (i) a single output stream comprising both of the phases, (ii) two or more divided output streams wherein at least one divided output stream substantially comprises the first phase and at least one divided output stream substantially comprises the second phase, or (iii) four or more divided output streams wherein at least two divided output streams substantially comprise the first phase and at least two divided output streams substantially comprise the second phase; and (E) contacting (i) the single output stream, (ii) one of the two or more divided output streams, or (iii) one of the four or more divided output streams with a polymer separation detection device.

28. A method according to claim 27, wherein the detection device is in communication with a speed control device, and the speed control device is in communication with a polymer metering pump which controls flow rate of one or more output streams.

29. A method according to claim 28 wherein, the polymer separation detection device (a) measures the amounts of each of the two mutually immiscible, melt-viscosity-differing thermoplastic polymer components in (i) the single output stream, (ii) one of the two or more divided output streams, or (iii) one of the four or more divided output streams and (b) signals the speed control device to signal the polymer metering pump to increase or decrease the flow rate of the one or more output streams to an extent needed to increase or decrease the amounts of the two mutually immiscible, melt-viscosity differing thermoplastic polymer components to desired levels;

the speed control device signals the polymer metering pump to increase or decrease the flow rate to said extent; and the polymer metering pump increases or decreases the flow rate to said extent.

30. A method according to claim 27, wherein the polymer separation detection device is an infrared spectrometer.

31. A method according to claim 27, wherein the polymer separation detection device is a near-infrared spectrometer.

32. A method of forming a sheath/core bicomponent fiber, comprising:

(A) providing a solid polymer mixture and converting it into a mixed liquid stream containing (i) less than 50% by volume of a first immiscible thermoplastic polymer component having a first melt viscosity and (ii) greater than 50% by volume of a second immiscible thermoplastic polymer component having a second melt viscosity, the second melt viscosity being greater than the first melt viscosity;

(B) extruding said mixed liquid stream to form an extruded liquid mixture;

(C) providing a shear zone and directing said extruded liquid mixture through said shear zone at a shear temperature and a shear rate sufficient to form a first discrete, continuous phase substantially comprising the first polymer component and a second discrete, continuous phase substantially comprising the second polymer component, the phases being arranged in a sheath/core configuration having a sheath substantially comprising the second phase and a core substantially comprising the first phase;

(D) removing the first and second discrete, continuous phases from the shear zone as (a) a single output stream comprising both of the phases, (b) two or more divided output streams, wherein at least one divided output stream substantially comprises the first phase and at least one divided output stream substantially comprises the second phase, or (c) four or more divided output streams, wherein at least two divided output streams substantially comprise the first phase and at least two divided output streams substantially comprise the second phase; and (E) spinning (a) the single output stream, (b) the two or more divided output streams, or (c) the four or more divided output streams to form said sheath/core bicomponent fiber such that the sheath of said bicomponent fiber substantially comprises the thermoplastic polymer component having the higher melt viscosity and the core of said bicomponent fiber substantially comprises the thermoplastic polymer component having the lower melt viscosity.

33. A method according to claim 32, wherein the extruding of the mixed liquid stream is carried out in a single extruder.

34. A method according to claim 32 wherein the spinning is carried out in a spinning apparatus comprising a spinneret plate and at least one distributor plate.

35. A method according to claim 34 wherein each distributor plate has an upstream surface and a downstream surface, either or both surfaces having multiple distribution flow paths etched thereon.

* * * * *